(12) United States Patent
Snyder et al.

(10) Patent No.: US 9,988,923 B2
(45) Date of Patent: Jun. 5, 2018

(54) SEAL FOR GAS TURBINE ENGINE

(71) Applicant: UNITED TECHNOLOGIES CORPORATION, Hartford, CT (US)

(72) Inventors: Brooks E. Snyder, Glastonbury, CT (US); Thomas N. Slavens, Vernon, CT (US); Mosheshe Camara-Khary Blake, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 236 days.

(21) Appl. No.: 14/915,410

(22) PCT Filed: Aug. 29, 2014

(86) PCT No.: PCT/US2014/053422
§ 371 (c)(1),
(2) Date: Feb. 29, 2016

(87) PCT Pub. No.: WO2015/031763
PCT Pub. Date: Mar. 5, 2015

(65) Prior Publication Data
US 2016/0215644 A1    Jul. 28, 2016

Related U.S. Application Data

(60) Provisional application No. 61/871,470, filed on Aug. 29, 2013.

(51) Int. Cl.
*F01D 5/22* (2006.01)
*F01D 11/20* (2006.01)
(Continued)

(52) U.S. Cl.
CPC .............. *F01D 11/20* (2013.01); *F01D 5/12* (2013.01); *F01D 5/22* (2013.01); *F01D 9/04* (2013.01);
(Continued)

(58) Field of Classification Search
CPC .... F01D 11/003; F01D 11/005; F01D 11/008; F16J 15/06; F16J 15/0887; F05D 29/043;
(Continued)

(56) References Cited

U.S. PATENT DOCUMENTS 4,184,689 A    1/1980  Brodell et al.
4,318,668 A    3/1982  Chaplin et al.
(Continued)

FOREIGN PATENT DOCUMENTS

EP    1591724 A1    11/2005
EP    1591725 A2    11/2005
(Continued)

OTHER PUBLICATIONS

The International Preliminary Report on Patentability for PCT Application No. PCT/US2014/053422, dated Mar. 10, 2016.
(Continued)

*Primary Examiner* — Woody Lee, Jr.
*Assistant Examiner* — Maxime Adjagbe
(74) *Attorney, Agent, or Firm* — Carlson, Gaskey & Olds, P.C.

(57) ABSTRACT

One exemplary embodiment of this disclosure relates to a gas turbine engine including a first engine component and a second engine component. The first engine component has a mate face adjacent a mate face of the second engine component. The engine further includes a seal between the mate face of the first engine component and the mate face of the second engine component. The seal establishes three points of contact with each mate face in at least one condition.

15 Claims, 3 Drawing Sheets

(51) Int. Cl.
*F01D 9/04* (2006.01)
*F01D 11/00* (2006.01)
*F01D 5/12* (2006.01)
*F01D 25/24* (2006.01)
*F16J 15/08* (2006.01)

(52) U.S. Cl.
CPC ............ F01D 9/041 (2013.01); F01D 11/005 (2013.01); F01D 11/008 (2013.01); F01D 25/24 (2013.01); F16J 15/0887 (2013.01); *F05D 2220/32* (2013.01); *F05D 2230/60* (2013.01); *F05D 2240/11* (2013.01); *F05D 2240/57* (2013.01); *F05D 2250/71* (2013.01); *F05D 2250/75* (2013.01); *F05D 2270/303* (2013.01); *F05D 2270/306* (2013.01)

(58) Field of Classification Search
CPC ............... F05D 29/542; F05D 2220/32; F05D 2220/11; F04D 29/03; F04D 29/542
See application file for complete search history.

(56) References Cited

U.S. PATENT DOCUMENTS

| | | |
|---|---|---|
| 4,452,462 A | 6/1984 | Karr, Jr. |
| 5,158,430 A | 10/1992 | Dixon et al. |
| 5,357,744 A | 10/1994 | Czachor |
| 5,655,876 A | 8/1997 | Rock et al. |
| 5,738,490 A | 4/1998 | Pizzi |
| 5,762,472 A | 6/1998 | Pizzi et al. |
| 5,868,398 A | 2/1999 | Maier et al. |
| 5,934,687 A | 8/1999 | Bagepalli et al. |
| 5,975,844 A | 11/1999 | Milazar et al. |
| 6,354,795 B1 | 3/2002 | White et al. |
| 6,413,042 B2 | 7/2002 | Correia |
| 6,431,825 B1 | 8/2002 | McLean |
| 6,568,692 B2 | 5/2003 | Kolodziej et al. |
| 6,722,850 B2 | 4/2004 | Burdgick |
| 6,733,234 B2 | 5/2004 | Paprotna et al. |
| 6,843,479 B2 | 1/2005 | Burdgick |
| 6,883,807 B2 | 4/2005 | Smed |
| 6,971,844 B2 | 12/2005 | Burdgick |
| 7,063,503 B2 | 6/2006 | Meisels |
| 7,261,514 B2 | 8/2007 | London et al. |
| 7,901,186 B2 | 3/2011 | Cornett et al. |
| 8,016,297 B2 | 9/2011 | Heinemann et al. |
| 8,206,087 B2 | 6/2012 | Campbell et al. |
| 2005/0008473 A1* | 1/2005 | Balsdon ................ F01D 11/005 415/110 |
| 2006/0082074 A1 | 4/2006 | Synnott et al. |
| 2007/0158919 A1 | 7/2007 | Bennett |
| 2007/0210536 A1 | 9/2007 | Paauwe |
| 2012/0274034 A1 | 11/2012 | Bouchard et al. |

FOREIGN PATENT DOCUMENTS

| | | |
|---|---|---|
| EP | 1944474 A2 | 7/2008 |
| GB | 2221000 A | 1/1990 |
| GB | 2401658 A | 11/2004 |

OTHER PUBLICATIONS

Supplementary European Search Report for European Application No. 14838947.1 dated Aug. 9, 2016.

* cited by examiner

ARCH-FLATTENING

RADIAL MISMATCH

ARCH-BINDING

SEAL FOR GAS TURBINE ENGINE

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into the core flow path of the gas turbine engine. These blades and vanes are typically cooled with a flow of cooling fluid. In order to separate the hot combustion gases from the flow of cooling fluid, seals are provided at various points in the engine. In one known sealing arrangement, the mating faces of adjacent engine components include a slot and a featherseal.

SUMMARY

One exemplary embodiment of this disclosure relates to a gas turbine engine including a first engine component and a second engine component. The first engine component has a mate face adjacent a mate face of the second engine component. The engine further includes a seal between the mate face of the first engine component and the mate face of the second engine component. The seal establishes three points of contact with each mate face in at least one condition.

In a further embodiment of any of the above, each mate face includes a slot formed therein, and the seal is received in each of the slots.

In a further embodiment of any of the above, each slot includes a first sloped surface, a second sloped surface, and a third surface therebetween.

In a further embodiment of any of the above, the seal contacts each of the first sloped surface, the second sloped surface, and the third surface to provide first, second, and third points of contact, respectively, between the seal and each mate face in the at least one condition.

In a further embodiment of any of the above, the seal includes a central curved portion near a centerline of the seal, and curved ends distal from the central curved portion. The curved ends are connected to the central curved portion by sloped walls extending from opposed sides of the central curved portion.

In a further embodiment of any of the above, in the at least one condition each sloped wall contacts a respective one of the mate faces to provide a first point of contact between the seal and the respective mate face, and each curved end contacts a respective one of the mate faces at two distinct points to provide second and third points of contact between the seal and the respective mate face.

In a further embodiment of any of the above, a circumferentially outermost portion of each curved end contacts a respective one of the mate faces, and wherein a radial apex of each curved end contacts a respective one of the mate faces.

In a further embodiment of any of the above, the central curved portion includes a curvature substantially corresponding to a first radius, and the curved ends include a curvature substantially corresponding to a second radius smaller than the first radius.

In a further embodiment of any of the above, the first radius has an origin radially spaced from the seal, and on a high pressure side of the seal.

In a further embodiment of any of the above, the second radius has an origin inside a slot formed in each one of the mate faces.

In a further embodiment of any of the above, the at least one condition includes a normal engine operating condition.

In a further embodiment of any of the above, the seal establishes at least two points of contact with each mate face in each of (1) an arch-binding condition, (2) a radial mismatch condition, and (3) an arch-flattening condition.

Another exemplary embodiment of this disclosure relates to a sealing assembly a first mate face including a first slot. The assembly also includes a second mate face adjacent the first mate face, with the second mate face including a second slot. A seal is received in the first slot and the second slot, the seal establishing three points of contact with each of the first mate face and the second mate face in at least one condition.

In a further embodiment of any of the above, the seal includes sloped walls extending from a central curved portion and curved ends extending from the sloped walls.

In a further embodiment of any of the above, the central curved portion includes a curvature substantially corresponding to a first radius, and wherein the curved ends include a curvature substantially corresponding to a second radius smaller than the first radius.

In a further embodiment of any of the above, both the first slot and the second slot include a first sloped surface, a second sloped surface, and a third surface therebetween.

In a further embodiment of any of the above, the seal contacts each of the first sloped surface, the second sloped surface, and the third surface to provide first, second, and third points of contact, respectively, between the seal and each mate face.

Another exemplary embodiment of this disclosure relates to a method including arranging a mate face of a first component adjacent a mate face of a second component to provide a track, pinching opposed sides of a seal toward one another, and inserting the seal into the track to provide three points of contact between the seal and each mate face.

In a further embodiment of any of the above, the method includes releasing the opposed sides after the seal is inserted into the track, such that opposed sides are urged away from one another to maintain the seal in the track.

In a further embodiment of any of the above, the method includes urging a curved end of the seal toward a radius of origin of the curved end by engaging the curved end with one of the mate faces.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

These and other features of the present disclosure can be best understood from the following drawings and detailed description.

DETAILED DESCRIPTION

Figure 1:
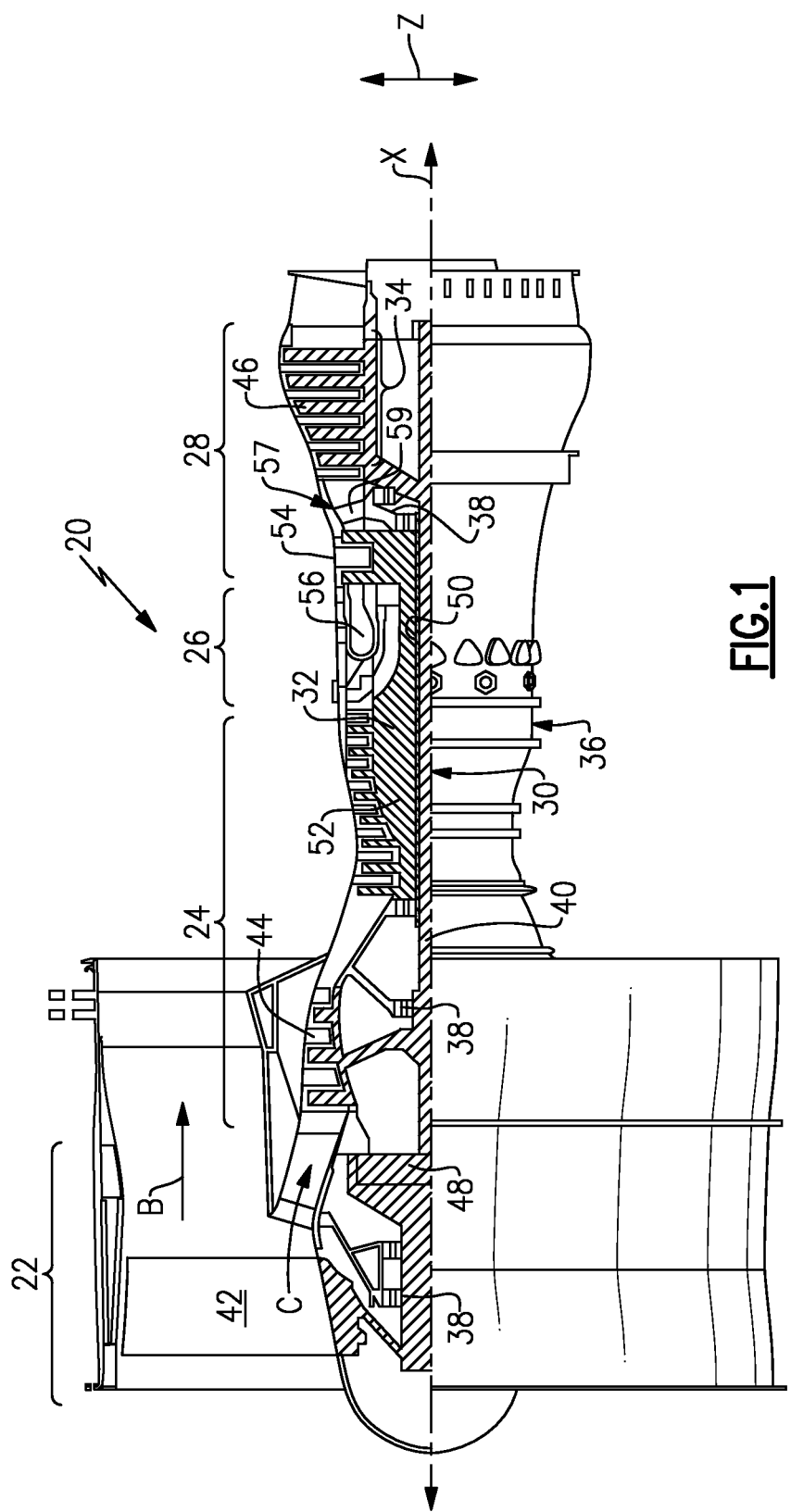
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44, then by the high pressure compressor 52, mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \, °R)/(518.7 \, °R)]^{0.5}$. The "Low corrected fan tip speed," as disclosed herein according to one non-limiting embodiment, is less than about 1150 ft/second.

Figure 2:
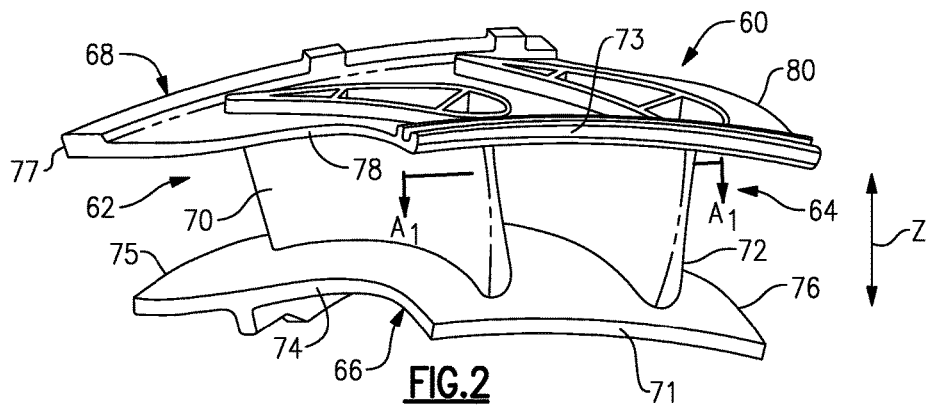
FIG. 2 is a perspective view of an example airfoil assembly.

FIG. 2 illustrates an example airfoil assembly 60 according to this disclosure. In this example, the airfoil assembly 60 is a "doublet," and includes a pair of stator vanes 62, 64. While a "doublet" is illustrated, it should be understood that this disclosure extends outside of "doublets" to "singlets," "triplets," etc., and in fact may be beneficial in the context of rotor blades, inlet guide vanes (e.g., the vanes 59 of the mid-turbine frame 57), blade outer air seals (BOAS), and other structures. The examples discussed herein may be particularly beneficial when used in the turbine section 28 of the engine 20, in which vanes are exposed to relatively high temperatures during engine operation.

The example airfoil assembly 60 includes an inner platform 66, an outer platform 68, and airfoil sections 70, 72 extending therebetween in a radial direction Z, which is substantially normal to the engine central longitudinal axis X. Each of the inner platform 66 and the outer platform 68 include a leading edge 71, 73, a trailing edge 75, 77, and plurality of circumferential mate faces. The inner platform 66 includes a first mate face 74 and a second mate face 76 on opposing circumferential sides thereof. Likewise, the outer platform 68 includes first and second mate faces 78, 80.

Figure 3:
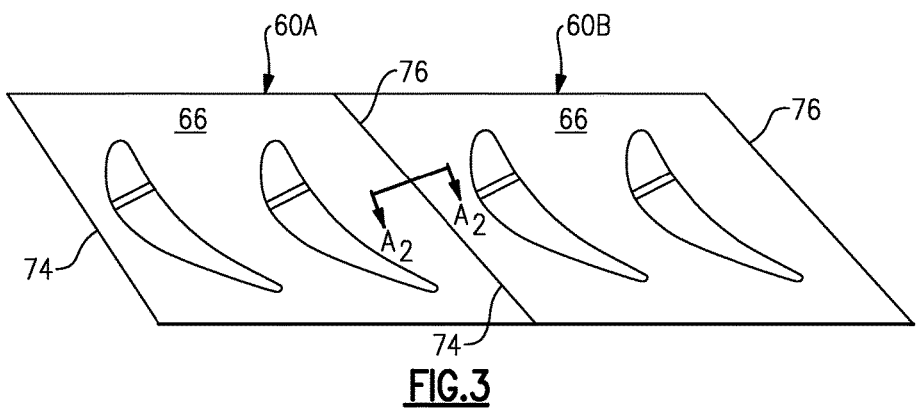
FIG. 3 is a top view of two adjacent airfoil assemblies.

FIG. 3 is representative of two airfoil assemblies (e.g., first and second engine components) 60A, 60B circumferentially arranged relative to one another, viewed along line A1-A1 from FIG. 2. As illustrated in FIG. 3, the mate faces 74, 76 of the inner platforms 66 are provided circumferentially adjacent one another.

Figure 4:
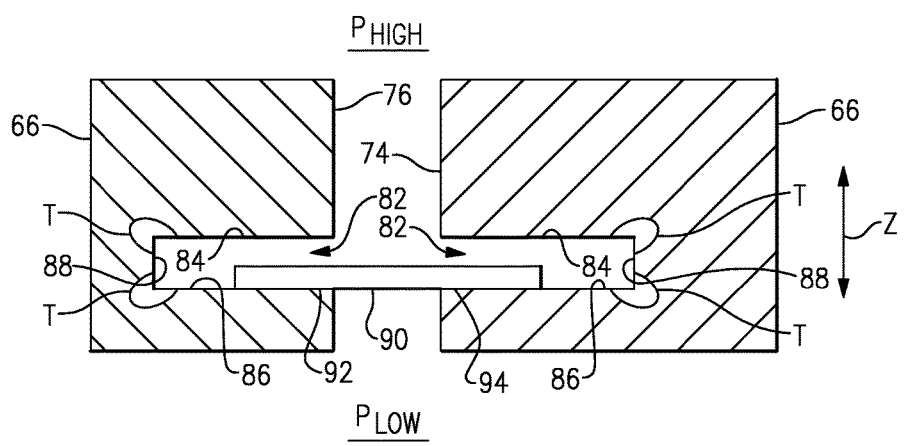
FIG. 4 illustrates a prior art featherseal arrangement.

FIG. 4 illustrates a prior art sealing arrangement, viewed along line A2-A2 from FIG. 3. In the prior art arrangement, each of the mate faces 74, 76 includes a featherseal slot 82 therein. The featherseal slots 82 in this example are generally rectangular, and include first and second horizontal surfaces 84, 86 and a vertical surface 88 at an end thereof. A substantially rectangular featherseal 90 is provided in each of the featherseal slots 82, and extends between the adjacent featherseal slots 82 and along the leading and trailing edges 71, 75.

During operation of the engine, a relatively high pressure $P_{HIGH}$ is provided on one side of the featherseal 90, while a relatively low pressure $P_{LOW}$ is provided on the opposite side of the pressure seal 90. For purposes of illustration, $P_{HIGH}$ is shown above $P_{LOW}$. In one example, the high pressure $P_{HIGH}$ is provided by a pressurized flow of cooling fluid from an upstream plenum. The high pressure $P_{HIGH}$, in the example of FIG. 4, urges the featherseal 90 against the second horizontal surfaces 86 to provide contact points 92, 94. These contact points 92, 94 provide a seal between the high pressure $P_{HIGH}$ and low pressure $P_{LOW}$ sides of the featherseal 90.

The arrangement of FIG. 4 includes relatively sharp corners between the first and second horizontal surfaces 84, 86, and the vertical surfaces 88. These sharp corners can lead to high thermal stress concentrations, illustrated at T. Further, because the featherseal 90 is generally planar, there may be leakage at the contact points 92, 94.

Figure 5:
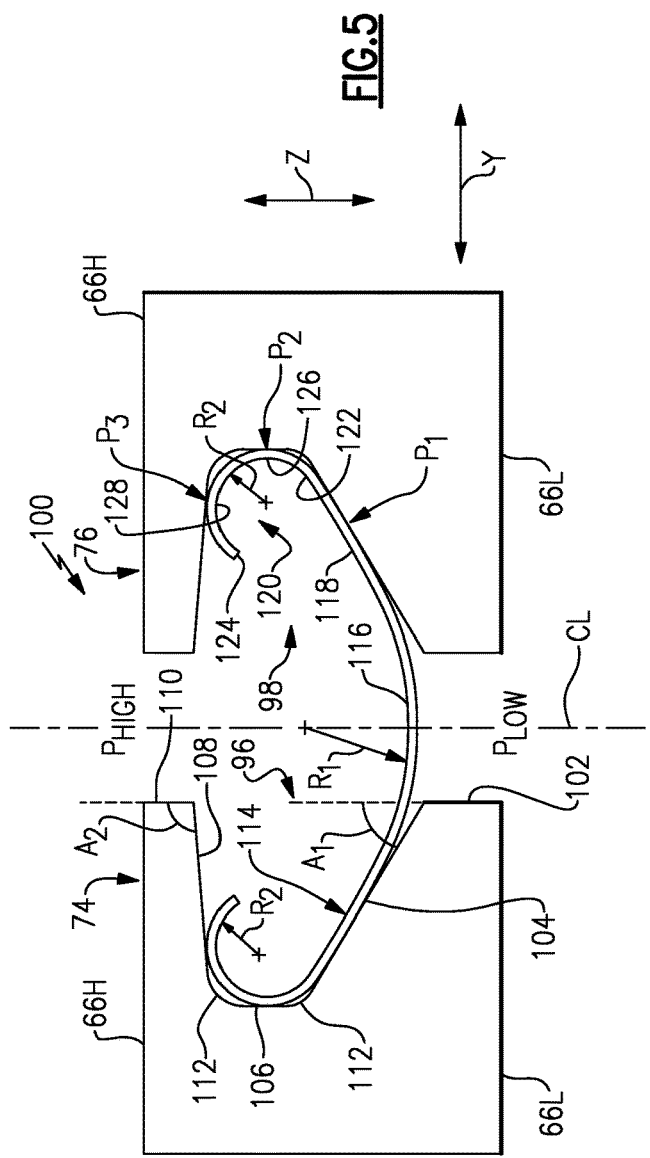
FIG. 5 illustrates an example sealing arrangement according to this disclosure.

FIG. 5 is a cross-sectional view taken along lines A2-A2, and illustrates a sealing arrangement 100 according to this disclosure. As illustrated in FIG. 5, the mate faces 74, 76 generally extend between a low pressure surface 66L of the inner platform 66 and a high pressure surface 66H of the inner platform 66. It should be understood that while FIG. 5 illustrates inner platforms 66, that this disclosure can be used relative to outer platforms 68.

Each of the mate faces 74, 76 includes a slot 96, 98 formed therein. When arranged next to one another, as illustrated, the slots 96, 98 form a track for receiving a seal 114, as will be discussed in detail below.

Moving from the low pressure surface 66L, each of the mate faces 74, 76 includes a first substantially vertical surface 102 parallel to a seal centerline CL. The first substantially vertical surface is adjacent an first sloped surface 104, which in this example extends from the first substantially vertical surface at an acute angle $A_1$ relative to the seal centerline CL, measured relative to FIG. 5 by beginning at twelve o'clock and moving toward the respective mate face 74, 76.

The first sloped surface 104 transitions into a second substantially vertical surface 106, which in turn is provided adjacent a second sloped surface 108. The second substantially vertical surface 106 need not be truly vertical (relative to the seal centerline CL), and may be sloped in some examples. The second sloped surface 108 is provided at an obtuse angle $A_2$ (measured the same way as $A_1$). The second sloped surface 108 finally transitions into a third substantially vertical surface 110, which is provided adjacent the high pressure surface 66H. In this example, the transitions between the second substantially vertical surface 106 and the sloped surfaces 104, 108 are rounded, illustrated at 112, to reduce stress concentrations.

The example sealing arrangement 100 includes a seal 114 provided between the first and second mate faces 74, 76. The seal 114 is generally open toward (e.g., faces) a high pressure side $P_{HIGH}$, which in this example is a side exposed to a pressurized flow of cooling fluid from an upstream plenum (for example), while the low pressure side $P_{LOW}$ is provided by the core flow path C. This disclosure can be used in contexts—for example, outside the context of stator vanes—where $P_{HIGH}$ is not generated by a flow of pressurized cooling fluid. This disclosure extends to any application where an effective seal between a high pressure and low pressure fluid is required.

In the illustrated example, the seal 114 includes a central curved portion 116 near the seal centerline CL. The central curved portion 116 has a curvature that substantially follows a first radius $R_1$ having an origin on the high pressure side $P_{HIGH}$ of the seal 114, and on the centerline of the seal CL in this example. The central curved portion 116 transitions into sloped walls 118 on each side thereof. The sloped walls 118 contact the first sloped surfaces 104 and are angled at substantially the same acute angle $A_1$ as the first sloped surfaces 104. Contact between the sloped walls 118 and the first sloped surfaces 104 establishes a first point of contact $P_1$ between the seal 114 and each mate face 74, 76.

The sloped walls 118 transition into curved ends 120 distal from the central curved portion 116. In this example, the curved ends 120 begin at a point 122, where the sloped walls 118 begin to diverge from the first sloped surfaces 104, and have a curvature that substantially follows a second radius $R_2$ to an end point 124. The origin of the second radius $R_2$ in this example is within the slots 96, 98, and is radially aligned with the midpoint of second substantially vertical surface 106. In this example, the second radius $R_2$ is smaller than the first radius $R_1$.

The curved ends 120 contact each of the mate faces 74, 76 at two distinct, spaced-apart points in at least one condition. In the illustrated condition, which corresponds to a normal operating condition, a circumferentially outermost portion 126 of each curved end 120 contacts the second substantially vertical surface 106 to provide a second point of contact $P_2$. In this example, the circumferentially outermost portion 126 is the portion of the curved end 120 furthest from the seal centerline CL in the circumferential direction Y, which is normal to the radial direction Z. Relative to FIG. 5, the circumferentially outermost portion 126 is near three o'clock for the right-hand curved end 120, and near nine o'clock for the left-hand curved end 120.

A third point of contact $P_3$ is provided by contact between a radial apex 128 of the curved ends 120 and the second sloped surface 108 of the mate faces 74, 76. Here, the term "radial apex" refers to the portion of the curved ends 120 furthest from the central curved portion 116 in the radial direction Z that engages the second sloped surface 108. Relative to FIG. 5, the radial apex 128 is located near twelve o'clock on the curved ends 120.

The seal 114 is formed of a metal, such as steel, in one example. The seal 114 has an inherent resiliency that causes the seal to spring outwardly, away from the seal centerline CL, to maintain the seal 114 in position between the mate faces 74, 76. The curved ends 120 of the seal 114 further spring outwardly away from the origin of the second radius $R_2$.

Once the engine 20 begins operation, the pressure differential between $P_{HIGH}$ and $P_{LOW}$ maintains the seal 114 in the position illustrated in FIG. 5. However, because of the arrangement of the seal 114 and the slots 96, 98 discussed above, the seal 114 can be maintained in the slots 96, 98 without any assistance from the pressure differential. In fact, the seal 114 is capable of withstanding a condition where the pressure differential becomes inverted from what is expected, for example if a pressure surge occurs on the $P_{LOW}$ side of the seal 114 (momentarily making the illustrated $P_{LOW}$ side the $P_{HIGH}$ side). In this instance, the seal 114 would still be mechanically retained in the slots 96, 98 by virtue of the above-discussed arrangement.

During assembly, the opposed sloped walls 118 of the seal 114 are pinched toward the seal centerline CL, and the seal 114 is inserted into the slots 96, 98. The curved ends 120 are urged toward the origin of the second radius $R_2$ by engagement between the curved ends 120 and the surfaces 104, 106, 108. Again, the seal has an inherent resiliency, and therefore the curved ends 120 are inherently biased away from the second radius $R_2$, against the urging of the surfaces 104, 106, 108. The inherent bias of the curved ends 120, coupled with the bias of the seal 114 away from the seal centerline CL, serves to maintain the seal 114 in the slots 96, 98, and in particular provides the first, second and third points of contact $P_1$-$P_3$.

Given the contours of the slots 96, 98, the mate faces 74, 76 can be machined using electron discharge machining (EDM) or another like machining process. In another example, the mate faces 74, 76 are cast or forged to provide the slots 96, 98 with the illustrated contours, and require minimal—if any—additional machining beyond the initial casting or forging.

Figure 6C:
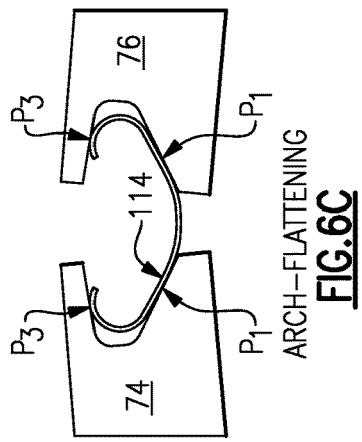
FIGS. 6A-6C illustrate the sealing arrangement according to this disclosure in radial mismatch, arch-binding, and arch-flattening orientations, respectively.
Figure 6B:
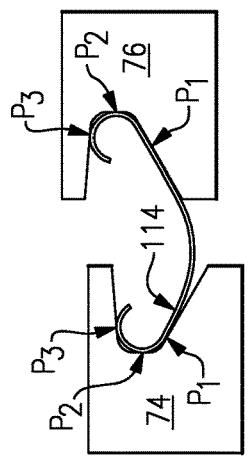
Figure 6A:
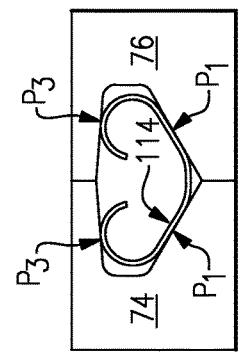

The disclosed arrangement of the seal 114 relative to the adjacent mate faces 74, 76 also provides enhanced sealing in conditions where there is a radial mismatch (FIG. 6A), arch-binding (FIG. 6B), or arch-flattening (FIG. 6C) between the first and second mate faces 74, 76. As illustrated, a radial mismatch is created when the adjacent mate faces 74, 76 are radially misaligned; the arch-binding condition is created when the adjacent mate faces abut one another (as compared to the circumferential space between the mate faces in FIG. 5, in particular between the substantially vertical surfaces 102); and the arch-flattening condition is provided when the mate faces 74, 76 are inclined away from one another. As illustrated, in the arch-binding and arch-flattening conditions, it is possible for the seal 114 to become disengaged from the second vertical surface 106. In these conditions, the seal 114 still maintains the first and third points of contact $P_1$, $P_3$ (e.g., at least two points of contact), and thus still provides an effective seal.

It should be understood that while the mate faces 74, 76 are arranged such that they lie in substantially the same plane, this disclosure extends to adjacent surfaces that are angled relative to one another (e.g., normal to one another).

Further, while the seal 114 is illustrated as being symmetrical about the seal centerline CL, the seal 114 may be asymmetrical in some examples.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a first engine component and a second engine component, the first engine component having a mate face adjacent a mate face of the second engine component; and
   a seal between the mate face of the first engine component and the mate face of the second engine component, wherein the seal establishes three points of contact with each mate face in a normal operating condition;
   wherein the seal includes a central curved portion near a centerline of the seal, and curved ends distal from the central curved portion, the curved ends connected to the central curved portion by sloped walls extending from opposed sides of the central curved portion;
   wherein the central curved portion includes a curvature substantially corresponding to a first radius, and wherein the curved ends include a curvature substantially corresponding to a second radius smaller than the first radius; and
   wherein the first radius has an origin radially spaced from the seal, and on a high pressure side of the seal such that the central curved portion is concave when viewed from the origin.

2. The gas turbine engine as recited in claim 1, wherein each mate face includes a slot formed therein, the seal received in each of the slots.

3. The gas turbine engine as recited in claim 2, wherein each slot includes a first sloped surface, a second sloped surface, and a third surface therebetween.

4. The gas turbine engine as recited in claim 3, wherein the seal contacts each of the first sloped surface, the second sloped surface, and the third surface to provide first, second, and third points of contact, respectively, between the seal and each mate face in the at least one condition.

5. The gas turbine engine as recited in claim 1, wherein, in the at least one condition, each sloped wall contacts a respective one of the mate faces to provide a first point of contact between the seal and the respective mate face, and each curved end contacts a respective one of the mate faces at two distinct points to provide second and third points of contact between the seal and the respective mate face.

6. The gas turbine engine as recited in claim 1, wherein a circumferentially outermost portion of each curved end contacts a respective one of the mate faces, and wherein a radial apex of each curved end contacts a respective one of the mate faces.

7. The gas turbine engine as recited in claim 1, wherein the second radius has an origin inside a slot formed in each one of the mate faces.

8. The engine as recited in claim 1, wherein the seal establishes at least two points of contact with each mate face in each of (1) an arch-binding condition, (2) a radial mismatch condition, and (3) an arch-flattening condition.

9. A sealing assembly, comprising:
a first mate face including a first slot;
a second mate face adjacent the first mate face, the second mate face including a second slot; and
a seal received in the first slot and the second slot, the seal establishing three points of contact with each of the first mate face and the second mate face in a normal operating condition, wherein the seal includes sloped walls extending from a central curved portion and curved ends extending from the sloped walls, the central curved portion includes a curvature substantially corresponding to a first radius, the first radius having an origin radially spaced from the seal and on a high pressure side of the seal such that the central curved portion is concave when viewed from the origin.

10. The seal assembly as recited in claim 9, wherein both the first slot and the second slot include a first sloped surface, a second sloped surface, and a third surface therebetween.

11. The seal assembly as recited in claim 10, wherein the seal contacts each of the first sloped surface, the second sloped surface, and the third surface to provide first, second, and third points of contact, respectively, between the seal and each mate face.

12. A method of assembly, comprising:
arranging a mate face of a first component adjacent a mate face of a second component to provide a track;
pinching opposed sides of a seal toward one another; and
inserting the seal into the track to provide three points of contact between the seal and each mate face, wherein the seal includes sloped walls extending from a central curved portion, the central curved portion includes a curvature substantially corresponding to a first radius, the first radius having an origin radially spaced from the seal and on a high pressure side of the seal such that the central curved portion is concave when viewed from the origin.

13. The method as recited in claim 12, including releasing the opposed sides after the seal is inserted into the track, such that opposed sides are urged away from one another to maintain the seal in the track.

14. The method as recited in claim 12, including urging a curved end of the seal toward a radius of origin of the curved end by engaging the curved end with one of the mate faces.

15. The gas turbine engine as recited in claim 1, wherein the origin of the first radius is on a centerline of the seal.

* * * * *